(12) United States Patent
Schulte

(10) Patent No.: US 7,207,752 B2
(45) Date of Patent: Apr. 24, 2007

(54) REAMER AND METHOD FOR REAMING

(75) Inventor: Paul Martin Schulte, Warren, MI (US)

(73) Assignee: Star Cutter Company, Farmington Hills, MI (US)

( * ) Notice: Subject to any disclaimer, the term of this patent is extended or adjusted under 35 U.S.C. 154(b) by 97 days.

(21) Appl. No.: 10/770,888

(22) Filed: Feb. 3, 2004

(65) Prior Publication Data

US 2005/0169721 A1  Aug. 4, 2005

(51) Int. Cl.
  *B23B 51/02* (2006.01)
  *B23B 51/06* (2006.01)
(52) U.S. Cl. .................. 408/224; 408/1 R; 408/59; 408/230
(58) Field of Classification Search ............. 408/227, 408/230, 224, 223, 225, 1 R, 57, 59
  See application file for complete search history.

(56) References Cited

U.S. PATENT DOCUMENTS

| | | | | |
|---|---|---|---|---|
| 190,307 A | * | 5/1877 | Goddard | 408/230 |
| 216,202 A | * | 6/1879 | Martin | 408/230 |
| 308,707 A | * | 12/1884 | Shirk | 408/230 |
| 319,614 A | * | 6/1885 | Pendleton | 408/230 |
| 1,630,602 A | * | 5/1927 | Blanco | 408/224 |
| 2,008,031 A | * | 7/1935 | Miltner | 408/56 |
| 2,303,487 A | * | 12/1942 | Miller | 408/200 |
| 2,342,143 A | * | 2/1944 | Howe | 408/224 |
| 2,623,552 A | * | 12/1952 | Compton et al. | 408/21 |
| 3,824,027 A | * | 7/1974 | Janci | 408/225 |
| 3,863,316 A | * | 2/1975 | Yeo | 407/54 |
| 3,913,196 A | * | 10/1975 | Maday | 407/54 |

(Continued)

FOREIGN PATENT DOCUMENTS

JP     56095528 A   *   8/1981

(Continued)

OTHER PUBLICATIONS

Heartech Precision Inc., "High-Precision Machine Tool Accessories," Reamer Series, Catalog No. HPI-98, pp. 50-52.

(Continued)

*Primary Examiner*—Monica Carter
*Assistant Examiner*—Michael W. Talbot
(74) *Attorney, Agent, or Firm*—Brooks Kushman P.C.

(57) ABSTRACT

The present invention discloses a reamer (20) and a method for reaming, for enlarging a pre-existing hole in a workpiece by rotational and axial cutting. The reamer (20) includes a body (24) extending from a shank (22). The body (24) has a first flute (30) providing a first flute cutting edge (32) at a distal end (34) of the body (24) for imparting a first cutting operation to the workpiece. The body (24) has a helical flute (42) providing a helical flute cutting edge (46) in the body distal end (34), radially spaced apart from the first flute cutting edge (32) for imparting a helical cutting operation to the workpiece. The first flute and helical flute cutting edges (32, 46) concurrently and collectively perform the first and helical cutting operations to a sculpture surface of the workpiece, thereby improving tolerances of the cutting operations, varying loads imparted to the workpiece and the reamer (20), and reducing heat generated therebetween.

36 Claims, 3 Drawing Sheets

U.S. PATENT DOCUMENTS

| | | | |
|---|---|---|---|
| 4,274,771 A * | 6/1981 | Nishimura | 408/230 |
| 4,480,949 A * | 11/1984 | Van De Bogart | 407/54 |
| 4,740,121 A * | 4/1988 | Arnold | 408/224 |
| 4,957,397 A * | 9/1990 | Huff | 408/224 |
| 5,238,335 A | 8/1993 | Nomura | |
| 5,282,705 A * | 2/1994 | Shiga et al. | 408/211 |
| 5,328,304 A | 7/1994 | Kress et al. | |
| 5,478,179 A | 12/1995 | Kress et al. | |
| 5,494,383 A | 2/1996 | Kress et al. | |
| 5,685,673 A * | 11/1997 | Jarvis | 408/230 |
| 5,795,111 A | 8/1998 | Kress et al. | |
| D400,547 S | 11/1998 | Albrektsson et al. | |
| 5,855,458 A * | 1/1999 | Reynolds et al. | 407/54 |
| 5,921,728 A | 7/1999 | Kammeraad et al. | |
| 5,967,712 A * | 10/1999 | Magill et al. | 408/227 |
| 6,179,528 B1 * | 1/2001 | Wardell | 407/54 |
| 6,293,740 B1 | 9/2001 | Schulte | |
| 6,343,902 B1 | 2/2002 | Nishikawa | |
| 6,379,090 B1 * | 4/2002 | Halley et al. | 408/227 |
| 6,503,030 B2 | 1/2003 | Kress et al. | |
| 6,547,495 B2 * | 4/2003 | Meece et al. | 408/1 R |
| 2002/0012574 A1 | 1/2002 | Kress et al. | |
| 2002/0090273 A1* | 7/2002 | Serwa | 409/132 |
| 2002/0102141 A1 | 8/2002 | Meece et al. | |
| 2002/0164219 A1 | 11/2002 | Burnette | |
| 2003/0019665 A1 | 1/2003 | Horton | |
| 2003/0185640 A1* | 10/2003 | Ito | 408/230 |

FOREIGN PATENT DOCUMENTS

| | | | |
|---|---|---|---|
| JP | 56095529 A | * | 8/1981 |
| JP | 58181508 A | * | 10/1983 |
| JP | 59205210 A | * | 11/1984 |
| JP | 59205211 A | * | 11/1984 |
| JP | 60094211 A | * | 5/1985 |
| JP | 01310805 A | * | 12/1989 |
| JP | 01310816 A | * | 12/1989 |
| JP | 02190215 A | * | 7/1990 |
| WO | WO 8403461 A | * | 9/1984 |

OTHER PUBLICATIONS

Guhring Incorporated, "Guhring Twist Drills," 4th Edition, 1987.

Cutting Tool Engineering, Information Services #36, Nov. 2003, p. 41.

Superion, Inc., "Solid Carbide and Carbide Head Boring Reamers."

E. Oberg et al., Machinery's Handbook 25, 25th Edition, "Reamers," p. 805-824, 1996, Industrial Press Inc., New York.

E. Oberg et al., Machinery's Handbook 25, 25th Edition, "Tooling and Toolmaking," p. 719-733, Industrial Press Inc., New York.

* cited by examiner

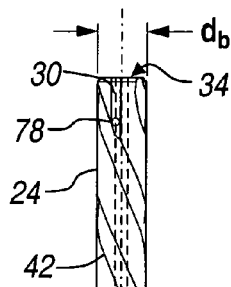
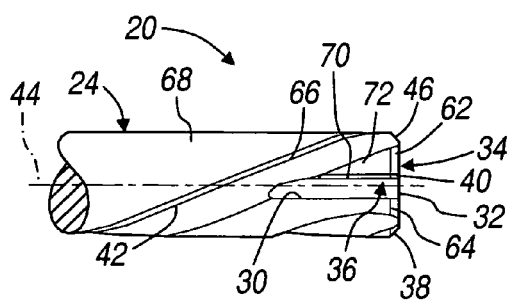
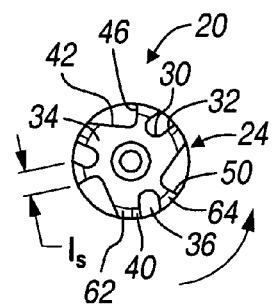
FIG. 3
FIG. 2
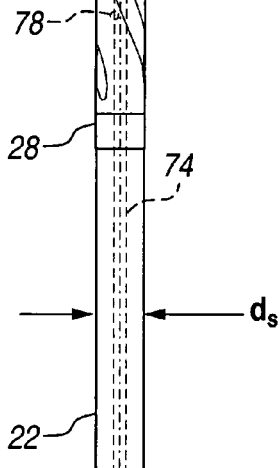
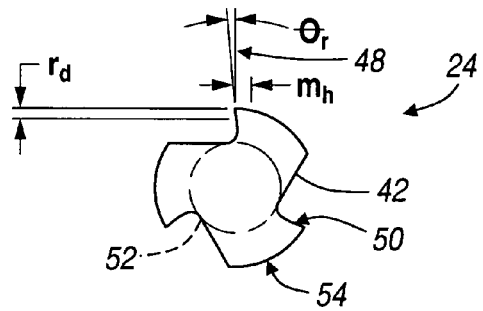
FIG. 4
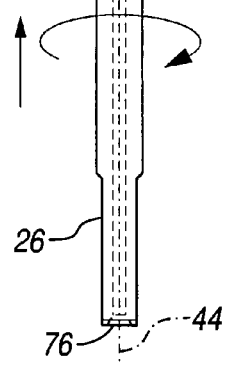
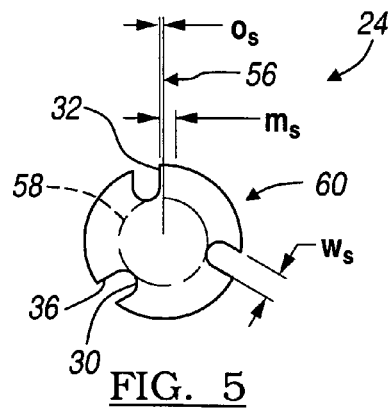
FIG. 1
FIG. 5

REAMER AND METHOD FOR REAMING

BACKGROUND OF THE INVENTION

1. Field of the Invention

The present invention relates to a cutting tool, particularly to a reamer.

2. Background Art

A reamer is a machining tool, particularly a cutting tool for enlarging or contouring a pre-existing hole in a workpiece by rotational and axial cutting. Reamers are utilized for removing a minimal amount of material from a workpiece, in comparison to a drill bit. When a particular application requires a hole that is machined to a tight tolerance, a drill bit, a gundrill or the like is utilized for defining the pre-existing hole by performing the majority of material removal, and a reamer is utilized for enlarging the pre-existing hole within the desired machining tolerance. Of course reamers may be utilized for enlarging a pre-existing hole that was generated by manufacturing processes other than a cutting operation, such as a hole developed in the fabrication of the workpiece.

Commonly bored holes that require a reamer for finishing the machining operation include, but are not limited to, valve guide bores, axle case bores, lifter bores, transmission carriers, and many other high precision applications.

Manufacturing processes commonly favor tools or tooling that may perform the desired job within the quickest time feasible with a high quality performance, thereby satisfying throughput and quality specifications. Accordingly, cutting tools such as reamers are often used in high speed operations experiencing high cutting pressures and relatively large amounts of heat, thereby limiting the life of a particular tool. Conventional reamers are characterized by a relatively high cost to produce and therefore are commonly remachined or reground to be reused after a sufficient amount of wear has been imparted on the tool. Due to the machining tolerances demanded upon reamers and the throughputs required of the machined workpieces, prior art reamers present a generally high cost in manufacturing environments due to the costs incurred in obtaining reamers, regrinding reamers and replacing reamers.

The prior art has recognized a need to fluctuate the loads imparted upon flutes formed within the reamer, and commonly such fluctuation is provided by "breaking up the flutes" by spacing cutting edges of the reamer unevenly about the reamer. The spacing is slight and is achieved by offsetting each flute in a reamer by two degrees or less to avoid equal spacing of the cutting edges.

Prior art reamers are generally characterized in two categories, straight flute reamers and helical flute reamers. Prior art reamers generally comprise an array of flutes formed therein, each providing a cutting edge at a distal end of a reamer body. Straight flute reamers include an array of straight flutes formed longitudinally therein and helical flute reamers include an array of helical flutes formed therein in a left hand direction for utilization of the reamer in a right hand rotational cutting direction. Some machining applications require that a particular hole being machined by both a straight flute reamer and a helical flute reamer to provide a hole within a desired tolerance. Accordingly, the prior art has also provided reamers having arrays of both straight flutes and helical flutes with cutting edges stepped axially relative to one another, such that a workpiece may experience a first cutting operation and subsequently a second cutting operation provided by a common reamer.

A goal of the present invention is to provide a reamer that machines within tolerances demanded in manufacturing environments and maximizes the life of the reamer by minimizing machining loads and heat experienced by the reamer and the associated work piece.

SUMMARY OF THE INVENTION

An aspect of the present invention is to provide a reamer comprising a longitudinal shank and a longitudinal body extending axially from the shank. The shank supports the body for rotation and for axial movement relative to a workpiece in a first hand rotational direction. The body includes a first flute providing a first flute cutting edge in a distal end of the body for imparting a first cutting operation to the workpiece. The body also includes a helical flute formed within the body in an angle relative to an axis of rotation that is greater than a corresponding angle of the first flute. The helical flute is formed in a second hand rotational direction that is opposite to the first hand rotational direction so that cutting debris is advanced ahead of the helical flute. The helical flute provides a helical flute cutting edge in the distal end of the body that is radially spaced apart from the first flute cutting edge, for imparting a helical cutting operation of the workpiece. At least a leading portion of the first flute and the helical flute cutting edges generally lie in a common radial plane for concurrently and collectively performing the primary and helical cutting operations to a sculpture surface of the workpiece, thereby improving tolerances of the cutting operations, varying the loads imparted the workpiece and the reamer, and reducing heat generated between the workpiece and the reamer.

Another aspect of the present invention is to provide a method for reaming a pre-existing hole. The method includes providing a reamer having a first flute with a first flute cutting edge in a distal end of the reamer, the helical flute being canted relative to the first flute, with at least one helical flute cutting edge in a distal end of the reamer. The method includes rotating one of the reamer or a workpiece and translating one of the reamer or the workpiece towards another so that the reamer is fed into the pre-existing hole. Both of the first flute and helical flute cutting edges concurrently provide cutting operations to a sculpture surface formed within the pre-existing hole.

BRIEF DESCRIPTION OF THE DRAWINGS

FIG. 1 is a side elevation view of a preferred embodiment of a reamer in accordance with the present invention;

FIG. 2 is an enlarged axial end view of the reamer of FIG. 1;

FIG. 3 is an enlarged partial side elevation view of the reamer of FIG. 1;

FIG. 4 is an enlarged axial end diagram of the reamer of FIG. 1 illustrating a set of flutes formed therein;

FIG. 5 is an enlarged axial end diagram of the reamer of FIG. 1 illustrating another set of flutes formed therein;

DETAILED DESCRIPTION OF THE PREFERRED EMBODIMENTS

Figure 6:
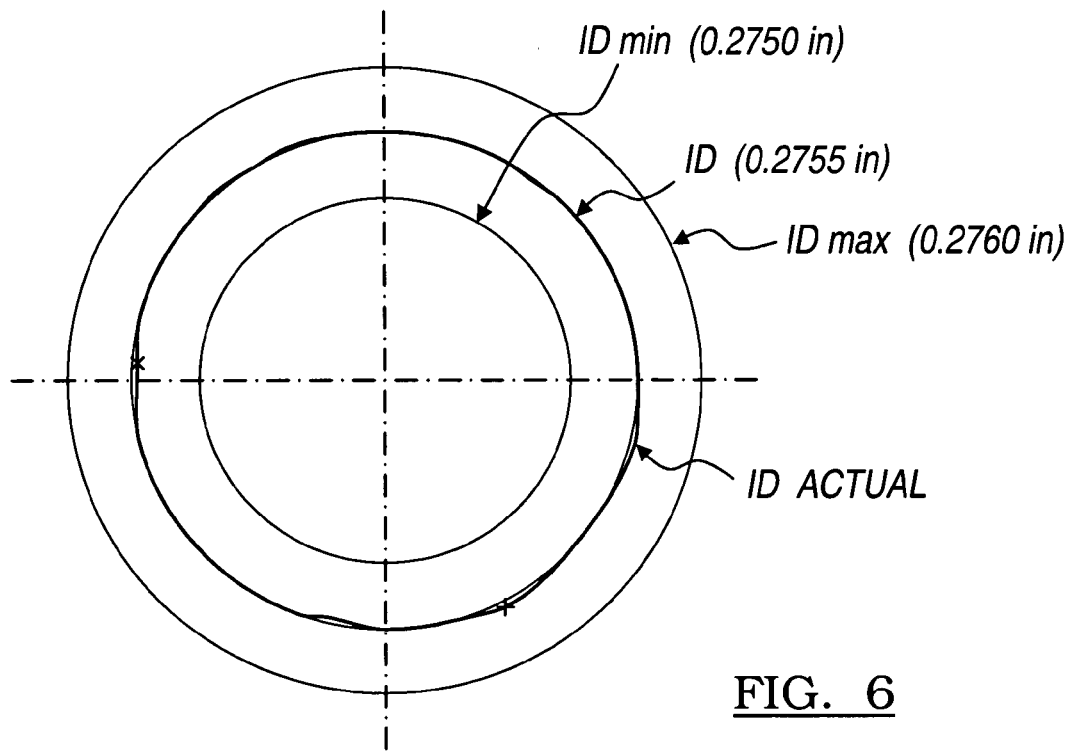
FIG. 6 is a graph of test data measured from a workpiece subsequent to a reaming operation performed by the reamer of FIG. 1.

With reference now to FIG. 1, a preferred embodiment reamer is illustrated in accordance with the teachings of the present invention and is referenced generally by numeral 20. The reamer 20 comprises a longitudinal shank 22 and a body 24. The shank 22 has an input end 26 that is adapted to be secured for supporting the body 24 for rotation and for axial movement relative to an associated workpiece (not shown). Specifically, the input end 26 of the reamer 20 is adapted to be received and secured within a chuck of a CNC machine for rotation and axial displacement of the reamer 20 relative to the workpiece. Of course, the invention also contemplates that the workpiece may be rotated, such as on a lathe, and the reamer 20 may be fixed, as one or both of the workpiece or reamer is axially translated to feed the reamer 20 within a pre-existing hole.

The preferred embodiment reamer 20 is fabricated from a high strength carbide or steel that is machined from a solid piece of stock material. Of course, any tooling material is contemplated by the present invention. The body 24 is generally cylindrical and has a diameter $d_b$, which is greater than a diameter $d_s$ of the shank 22. The preferred embodiment reamer 20 is utilized for reaming pre-existing holes in valve guides that are secured within a cylinder head of an automotive engine assembly. The valve guides are formed from a powdered metal alloy that is provided with a pre-existing hole that is either pre-drilled or formed therein by the powder metal compressing process. Accordingly, the length of the reamer 20 and the diameter $d_b$ of the body 24 are dictated by the specific application to perform the cutting operation to the workpiece. The preferred embodiment reamer 20 has a length of 10.7 inches and a body diameter $d_b$ of 0.2755+0.0/−0.0002 inches. The body 24 extends axially from the shank 22 and the diameters thereof are blended in a frusto-conical region 28.

The reamer body 24 includes a first set of flutes and a second set of flutes. No weight is to be applied to the order of the flutes, rather the order merely represents the order of introduction herein.

Referring now to FIGS. 1–3, the first set of flutes is provided in the reamer body 24 as an array of three straight flutes 30. The present invention contemplates any numbers of flutes in the first set of flutes. Each straight flute 30 provides a straight flute cutting edge 32 at a distal end 34 of the body 24. One preferred embodiment of reamer 20 is utilized for rotation in a right hand rotational direction. Specifically, the reamer 20 is rotated counterclockwise when viewed from the axial end view of the distal end 34 of the reamer 20 as illustrated in FIG. 2. Accordingly, each straight flute 30 includes a straight flute rake surface 36 provided within the flute 30, adjacent to the straight flute cutting edge 32. The distal end 34 of the reamer body 24 includes a leading edge formed thereabout, illustrated as a chamfer 38. The chamfer 38 of the reamer 20 is preferably 0.024±0.005 inches in the longitudinal direction. The thickness of material removed from the pre-existing hole is less than a transverse dimension of the chamfer 38 and therefore virtually the entire straight flute effective cutting edge 32 is formed at the intersection of the straight flute 30 and the chamfer 38. Of course, the invention contemplates that the cutting edge 32 could include an end cutting edge and/or a side cutting edge. The chamfer 38 also provides a primary relief surface 40 formed along the chamfer 38 circumferentially rearward in the direction of rotation of the cutting edge 32.

The second set of flutes includes at least one helical flute, preferably an array of helical flutes 42 formed within the body 24 of the reamer 20. The array of helical flutes 42 is equal in number to that of the straight flutes 30, which is three flutes per array in the preferred embodiment of reamer 20. The helical flutes 42 are each formed about the body 24 at an angle relative to an axis of rotation 44 of the reamer 20. Each helical flute 42 is formed in a left hand rotational direction to thereby advance debris caused by the cutting operation ahead of the helical flutes 42. Each helical flute 42 provides a helical flute cutting edge 46 at the body distal end 34. Each helical flute cutting edge 46 is formed at the intersection of the associated helical flute 42 and the chamfer 38. Of course, the invention contemplates that the helical flute cutting edge 46 could include an end cutting edge and a side cutting edge as well.

The array of straight flutes 30 and the array of helical flutes 42 are arranged such that each straight flute 30 is radially spaced apart and oriented between a pair of helical flutes 42 at the body distal end 34. The spacing provides an array of straight flute cutting edges 32 and helical flute cutting edges 46 formed at the body distal end 34 such that they collectively engage a sculpture surface of the workpiece and perform the straight flute and helical flute cutting operations collectively within a region that may be intersected by a common radial plane.

This spacing and sequence of the straight flute cutting edges 32 and the helical flute cutting edges 46 varies the chip loads experienced by each cutting edge, causing the amount of material removed from the workpiece to fluctuate. The fluctuation in material removal reduces the amount of heat experienced between the reamer 20 and the workpiece. Many advantages are provided by reducing the loads and heat experienced by the reamer 20 and the workpiece. By reducing the heat, thermal expansion can be minimized, thereby reducing the amount of lobing (See FIG. 7) provided in the finished hole, and finer tolerances may be achieved than that of the prior art. Additionally, the reamer 20 of the present invention may be operated at greater speeds, by increasing feed rate and rotation rate, thereby maximizing throughput while providing quality machined components.

FIG. 4 is a schematic illustration of the reamer body 24 and the helical flutes 42. Longitudinal body 24 includes an imaginary plane 48 than extends axially through the axis of rotation 44. Each helical flute 42 is formed ahead of the imaginary plane 48 in the right hand rotational direction, thereby providing a negative rake angle to a rake surface 50 of each helical flute 42. The rake angle $\theta_r$ of the helical flute rake surfaces 50 of the preferred embodiment reamer 20 is a negative one and one half degrees. Each rake surface 50 of each helical flute 42 preferably has a rake depth $r_d$ of about 0.020 inches. Each helical flute 42 is formed radially inward, providing a web 52 as illustrated in phantom, of about 0.220 inches preferably. Each helical flute 42 of the preferred embodiment reamer 20 has a flute length of 3.150 inches. The helical flutes 42 are equally spaced about the body 24 and therefore are spaced 120 degrees from each helical flute 42 to the next. This spacing results in a series of helical lands 54 oriented between each sequential pair of helical flutes 42. The lands 54 of the preferred embodiment reamer 20 preferably have a reference width of about 0.190 inches.

The prior art teaches unequal spacing of reamer flutes to provide fluctuations in chip loads to reduce the loading and heat imparted to the reamer and the workpiece. Although the helical flutes 42 are provided equally spaced about the axis of rotation 44, the invention contemplates that the helical flutes 42 may be provided with an angular spacing tolerance that is equal to one half of an angular displacement between sequential helical flutes 42. This angular spacing tolerance therefore is equal to 360 degrees divided by twice the number of helical flutes provided in the array. The preferred embodiment reamer 20 employs equal angular spacing of the helical flutes 42 about the center of rotation 44 because the fluctuations in chip loads provided by the combination of helical flute cutting edges 46 and straight flute cutting edges 32 renders unequal spacing of the helical flutes 42 unnecessary.

Referring now to FIG. 5, the reamer body 24 is illustrated with the straight flutes 30 formed therein. The invention contemplates that the "straight" flutes 30 need not be perfectly straight. Rather, this first set of flutes may be any set of flutes that is angled relative to the axis of rotation 44 at an angle less than that provided for the helical flute 42. For example, the straight flutes 30 could be alternatively provided at a one degree helix with a straight flute cutting edge or with a helical flute cutting edge provided at the body distal end 34. Although the invention contemplates any flute with an angle relative to the axis of rotation 44 that is less than that provided for the helical flutes 42, the preferred embodiment reamer 20 includes the array of straight flutes 30 in accordance with the present invention.

Straight flutes 30 are each formed with a width $w_s$ of about 0.068 inches. The body 24 has an imaginary plane 56 extending axially through the axis of rotation 44. Each straight flute 30 is formed ahead of the imaginary plane 56 in the right hand rotational direction to provide a negative rake angle to the straight flute cutting edge 32. Each straight flute 30 is offset from the imaginary plane 56 by an offset $o_s$ of for example, 0.005 to 0.007 inches. The straight flutes 30 are cut to a depth to provide a remaining web 58 illustrated in phantom of (in this example) 0.188 inches in diameter. The straight flutes 30 are formed equidistantly about the axis of rotation 44 and therefore are offset 120° relative to one another. The invention contemplates unequal spacing with an angular tolerance of one half the angular distance between the sequential flutes to vary the chip loading imparted upon the reamer 20 and the workpiece. However, this unequal spacing is unnecessary due to the results provided by the combination of the straight flute cutting edges 32 and the helical flute cutting edges 46 for varying the loads.

The array of straight flutes 30 provides a series of straight lands 60 oriented between sequential straight flutes 30 with a reference dimension that can be measured in a common radial plane of about 0.205 inches. The straight flutes 30 are formed axially rearward until intersecting with one of the helical flutes 42 as illustrated in FIG. 3.

Referring now to FIG. 2, the spacing of the straight flutes relative to the helical flutes is illustrated by a linear spacing dimension $l_s$ from the helical flute rake surface 50 to the beginning of the straight flute 30, which is measured as 0.030 inches for a preferred embodiment of reamer 20. This linear spacing dimension $l_s$ can be obtained by testing various spacings of the helical flutes 42 and straight flutes 30 to obtain an optimal linear spacing dimension $l_s$ for the workpiece that the cutting operations are to be performed upon to achieve desired results. Although the straight flutes 30 and the helical flutes 42 are illustrated nonintersecting at the distal end 34, the invention contemplates that the straight flutes 30 and the helical flutes 42 could be provided intersecting at the body distal end 34 as long as the longitudinal dimension between the straight flute cutting edges 32 and the helical flute cutting edges 46 is less than ten percent of the diameter $d_b$ of the reamer body 24.

The invention also contemplates that the reamer body may be tapered or partially tapered at a forward portion thereof for modifying the amount of material removed and for providing side cutting edges along the straight flutes 30 and helical flutes 42, or for reaming a tapered hole.

The primary relief surface 40 provides a relief angle relative to the sculpture surface of about twelve degrees for providing clearance between the reamer 20 and the sculpture surface of the workpiece and for relative cooling therebetween during the straight flute cutting operation. A secondary relief surface 62 is provided adjacent to the primary relief surface 40 and rotationally rearward thereof for providing further clearance between the reamer 20 and the workpiece sculpture surface. In one embodiment, the secondary relief surface 62 is provided with a secondary relief angle of thirty-five degrees. The helical flute cutting edges 46 each include a relief surface 64 having a relief angle of about twelve degrees.

Referring to FIG. 3, each helical flute 42 is provided with a helical cylindrical margin 66 provided adjacent to the associated helical flute 42, rearward of the rake surface 50 in the cutting direction. The helical cylindrical margins 66 each have a diameter $d_b$ generally equivalent to that of the hole being formed to thereby provide bearing support to the reamer 20 during the cutting operations. The helical cylindrical margins 66 provide bearing support that is effective within a through hole or within a hole overlapping or intersecting other holes, keyways or groves as the helical cylindrical margins 66 provide a bridge over these profiles to maintain consistent cutting operations from the reamer 20.

Referring now to FIG. 4, the helical cylindrical margins 66 each have in one embodiment a width $m_h$ of 0.015 to 0.020 inches. The helical cylindrical margins 66 are provided by machining an outside diameter primary clearance 68 into each helical land 54 for recessing the land 54 such that the remaining material provides the associated helical cylindrical margin 66.

Referring again to FIG. 3, the reamer body 24 is provided with a series of longitudinal straight cylindrical margins 70 each formed adjacent to the corresponding straight flute 30 and oriented rearward thereof in the rotational cutting direction. The straight cylindrical margins 70 each have a diameter equal to that of the hole being formed $d_b$ for providing additional bearing support to the reamer body 24 during the cutting operations. Referring to FIG. 5, each straight cylindrical margin 70 has a width $m_s$ of 0.008 to 0.012 inches. The straight cylindrical margins 70 are provided by machining of an outside diameter secondary clearance 72 along each straight land 60 thereby recessing the land 60 and providing clearance so that the straight cylindrical margins 70 are remaining.

The bearing support provided by the straight cylindrical margins 70 and the helical cylindrical margins 66 are sufficient to bearingly support the reamer body 24 during the cutting operations of the straight flute and helical flute cutting edges 32, 46.

Many cutting operations utilize cutting fluid to lubricate the reamer 20 and workpiece and to reduce heat therebetween during the cutting operation. The reamer 20 may include a fluid passage 74 illustrated as hidden in FIG. 1.

The shank input end 26 includes an ingress port 76 therein for receiving a cutting fluid to be conveyed through the fluid passage 74. Each helical margin includes an egress port 78 illustrated hidden in FIG. 1 that connects with the fluid passage 74. Additionally, each straight flute 30 includes an egress port 78 that is connected to the fluid passage 74. During the cutting operations, cutting fluid such as coolant is pumped into the ingress port 76, conveyed through the fluid passage 74 and exits the egress ports 78 formed in the helical flutes 42 and straight flutes 30 thereby cooling the reamer 20 and the workpiece. Cutting fluid is dispensed to the associated rakes, cutting edges and relief surfaces thereby removing debris and minimizing the build up of heat. The fluid passage 74 may be formed longitudinally and continuously through the reamer 20. However, an intersection of the body distal end 34 and the fluid passage 74 should be capped to prevent coolant from exiting an orifice at the distal end 34.

Referring now to FIG. 6, the results of a sample valve guide reamed by the preferred embodiment reamer 20 is illustrated. The diameter of the valve guide was measured with a probe having a 0.1 inch diameter that measured 326 points within the inside diameter of the valve guide. The chart of FIG. 6 includes three concentric circles. The intermediate concentric circle labeled ID represents the target dimension for the inside diameter of the valve guide, which is 0.2755 inches. The tolerance for this hole is plus or minus 0.0005 inches. The minimum tolerance is represented in the graph by the inner circle $ID_{min}$, which is equivalent to 0.2750 inches. The maximum tolerance of the operation is illustrated by the outer circle labeled $ID_{max}$, which is equivalent to 0.2760 inches. The actual hole formed in the valve guide is illustrated by $ID_{actual}$, which represents the hole after having been reamed by the reamer 20. The extreme dimension inside of the target diameter and the extreme dimension outside the target diameter are both presented by stars on the graph. The largest variation of the actual inner diameter was measured at 0.00004 inches, well within the tolerance range.

Figure 7:
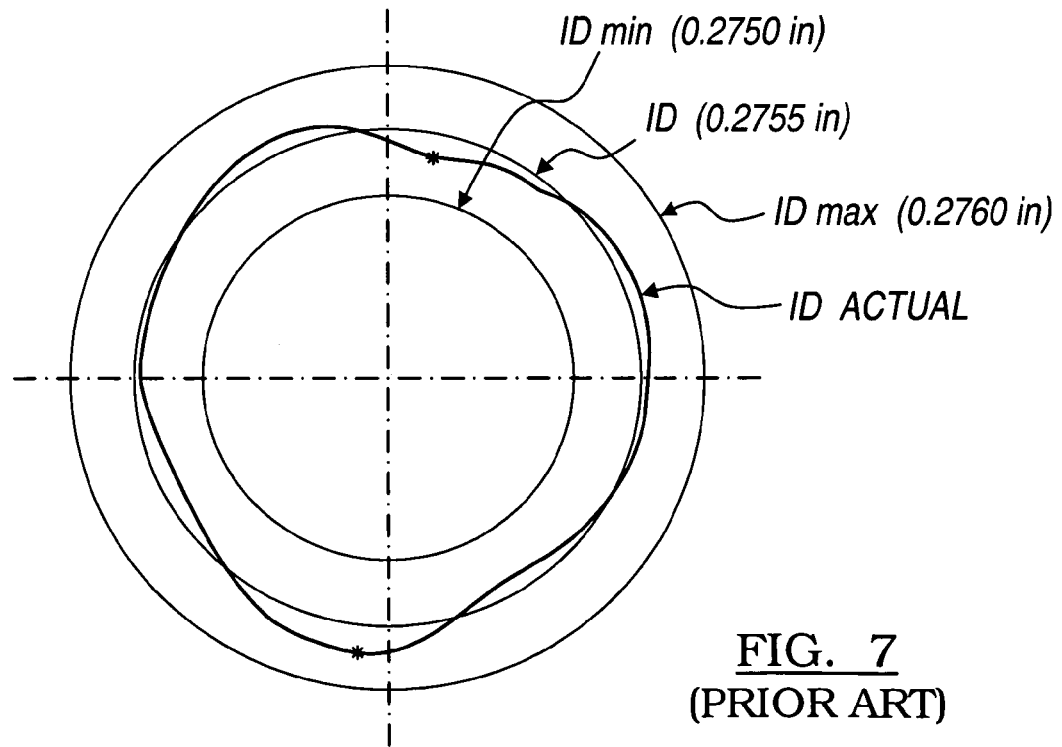
FIG. 7 is a graph of test data measured from a workpiece subsequent to a reaming operation performed by a prior art reamer.

A similar valve guide was subjected to a reaming operation performed by a prior art reamer and the results of which are graphed and illustrated by FIG. 7. The actual inner diameter $ID_{actual}$ that was reamed by the prior art reamer yielded a tolerance from the target diameter of 0.0002 inches. Other prior art samples were tested ranging from 0.0002 inches to 0.0004 inches, however the sample illustrated is adequate for comparison with the present invention. The prior art reamer provided a wide range of lobing, and utilized more of the tolerance range than that required by the reamer 20 of the present invention. If the reaming application required a tighter tolerance, for example 0.0003 inches, the prior art reamer would have been insufficient. However the reamer 20 of the present invention would have met such a tolerance.

As reamers are subjected to wear, the graph of the actual inner diameter $ID_{actual}$ expands in range, approaching the tolerance limits. Upon reaching the maximum tolerance allowed, or closely reaching the maximum tolerance, the reamer requires regrinding, which is costly and labor intensive. For the present valve guide application, the reamer 20 can ream more holes than that of the prior art reamer before requiring regrinding as the initial inner diameter actual $ID_{actual}$ range is much closer to the target inner diameter ID than that of the prior art reamer. Accordingly, the reamer 20 of the present invention may be utilized for maximizing throughput by reaming workpieces at a faster rate, while providing a higher quality machine workpiece, and out living the prior art reamer.

Figure 8:
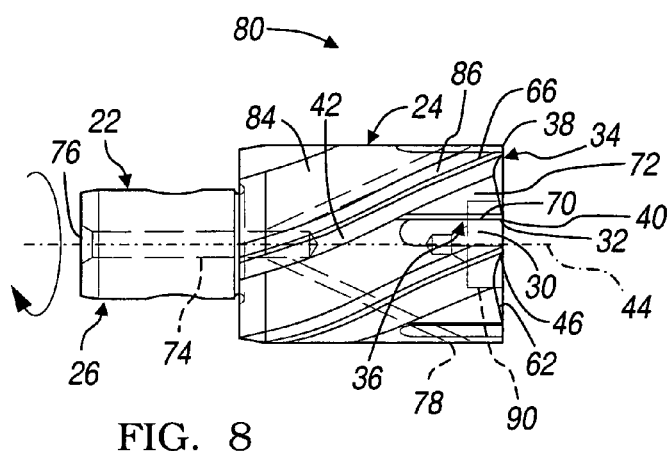
FIG. 8 is a side elevation view of an alternative embodiment reamer in accordance with the present invention.
Figure 9:
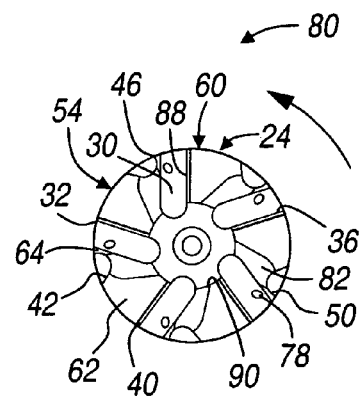
FIG. 9 is an axial end view of the reamer of FIG. 8.

Referring now to FIGS. 8 and 9, an alternative embodiment of reamer 80 is illustrated in accordance with the present invention. Like elements are assigned same reference numerals. New elements are assigned new reference numerals. The reamer 80 includes a shank 22 and a body 24 extending from the shank 22. The shank 22 includes an input end 26 that is adapted to be received within a chuck of a boring machine, such as a CNC machine or the like. The body 24 includes an array of straight flutes 30. Five straight flutes 30 are provided within the array and are equidistantly spaced about the axis of rotation 44 with a seventy-two degree offset between sequential straight flutes 30. Each straight flute 30 provides a straight flute cutting edge 32 at a distal end 34 of the body 24. The body 24 has an overall diameter of 1.2635 inches and is utilized for reaming larger holes than that of the preferred embodiment reamer 20. Each straight flute 30 provides a straight flute rake surface 36 that is adjacent to the respective straight flute cutting edge 32. The straight flute cutting edge 32 includes a leading edge, preferably a chamfer 38 for performing a cutting operation. A primary relief surface 40 is provided adjacent to the straight flute cutting edge 32 for providing relief and clearance between the reamer body 24 and the associated sculpture surface of the workpiece. A secondary relief surface 62 is provided rearward of the primary relief surface 40. Any number of relief surfaces is contemplated within the spirit and scope of the present invention and alternatively a cam relief surface may be provided.

The reamer body 24 also includes an array of five equally spaced helical flutes 42 formed therein. Each helical flute 42 provides a helical flute cutting edge 46 at the distal end 34 of the reamer body 24. Each helical flute 42 includes a helical flute rake surface 50 formed therein adjacent to the helical flute cutting edge 46.

The straight flutes 30 and the helical flutes 42 are provided ahead of center in the right hand rotational direction to thereby provide negative rakes to each associated cutting edge 32, 46. The helical flutes 42 and the straight flutes 30 provide a series of helical lands 54 and straight lands 60 respectively. Each helical flute cutting edge 46 is provided with a relief surface 64 adjacent thereto. Additionally, to assist in the removal of debris from the at least one helical flute cutting edge, a plurality of gashes 82 are provided, each intersecting one of the helical flutes 42 and a sequentially rearward straight flute 30. The helical flute relief surface 64 has a greater relief angle than that provided for the straight flute primary relief surface 40 as characterized by the relief angle required for the helical and straight cutting operations respectively. The helical lands 54 each include a helical cylindrical margin 66 and a secondary helical cylindrical margin 84 formed thereabout by a primary outer diameter clearance 86 formed within each helical land 54. Each straight land 60 includes a straight cylindrical margin 70 provided by a secondary outer diameter clearance 72 formed therein. The five straight cylindrical margins 70 and the five helical margins 66 collectively provide bearing support to the reamer body 24 within the machined hole during a cutting operation.

Due to the size of the leading edge formed on the straight flute cutting edge 32, and due to the amount of material removed, the straight flutes 30 may provide a series of end cutting edges 88 each formed at the intersection of the associated straight flute 30 and the distal end 34 of the body 24.

The reamer 80 includes a fluid passage 74 formed therein with an ingress port 76 formed in the input end 26 of the shank 22. The reamer body also includes a series of egress ports 78 each formed within one of the straight flutes 30, and interconnecting with the fluid passage 74 such that cutting fluid may be fed into the ingress port 76, conveyed through the fluid passage 74 and dispensed from the egress port 78 to cool the cutting edges of the reamer 80. The distal end 34 of the reamer body 24 includes a central bore 90 formed therein to assist in flow of the coolant and debris from the sculpture surface of the workpiece.

Figure 10:
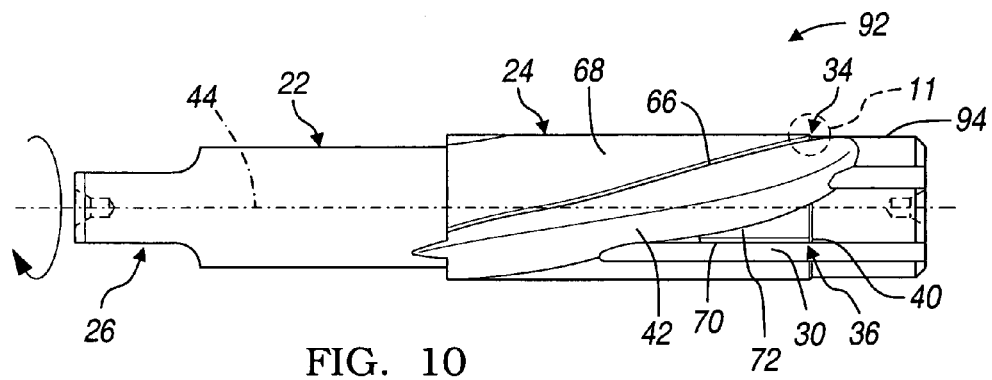
FIG. 10 is a side elevation view of another alternative embodiment reamer in accordance with the present invention.

With reference now to FIG. 10, another alternative embodiment reamer 92 is provided in accordance with the teachings of the present invention, and the reamer 92 is provided with features similar to the prior two emodiments. The reamer 92 includes a pilot 94 extending axially forward from the reamer body distal end 34. The reamer body 24 has an outer diameter of 0.9052 inches. The pilot 94 has an outer diameter of 0.8790 inches and is sized to be received within the pre-existing hole to provide bearing support to the reamer 92 within the hole being formed in the workpiece.

Figure 11:
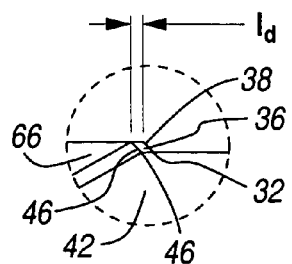
FIG. 11 is an enlarged partial side view of the reamer from view circle 11 of FIG. 10.

Referring now to FIG. 11, an enlarged view of the cutting edges of the reamer 92 are illustrated. Specifically, the helical flute cutting edge 46 is recessed axially rearward from the body distal end 34 further than that of the straight flute cutting edge 32. The longitudinal dimension of this offset is referenced by $l_d$ and is equivalent to 0.015 inches. Although the helical flute cutting edge 46 is displaced axially rearward, this displacement is within ten percent of the reamer body diameter. The helical flute cutting edge 46 is sufficiently proximate to the straight flute cutting edge 32 such that the straight flute cutting edge 32 and helical flute cutting edge 46 provide fluctuating loads upon material removal during the cutting operation, thereby improving tolerances, reducing heat between the reamer 92 and the workpiece, and prolonging the life of the reamer 92.

The present invention also provides a method for reaming a pre-existing hole. Referring again to FIGS. 1–6, the method includes providing the reamer 20 with straight flutes 30 and helical flutes 42 with respective straight flute cutting edges 32 and helical flute cutting edges 46 in the body distal end 34. The method includes rotating one of the reamer 20 or the associated workpiece and translating one of the reamer 20 and the workpiece towards another, thereby feeding the reamer 20 into the pre-existing hole. Therefore, the straight flute cutting edges 32 and the helical flute cutting edges 46 concurrently provide cutting operations to the sculpture surface providing a high quality and effective finished product.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A reamer for enlarging a pre-existing hole in a workpiece by rotational and axial cutting, the reamer comprising:
   a longitudinal shank for supporting a body of a reamer for enlarging a pre-existing hole in a workpiece by rotation and axial movement relative to the workpiece in a first hand rotational direction; and
   a longitudinal body extending axially from the shank, the body having at least one first flute formed therein, providing at least one first flute cutting edge in a distal end of the body for imparting a first cutting operation to the workpiece, the body having at least one helical flute formed therein at an angle relative to an axis of rotation that is greater than that of the at least one first flute, the at least one helical flute being formed in a second hand rotational direction opposite to the first hand rotational direction so that cutting debris is advanced ahead of the at least one helical flute, the at least one helical flute providing at least one helical flute cutting edge in the body distal end, radially spaced apart from the at least one first flute cutting edge, for imparting a helical cutting operation to the workpiece so that at least a leading portion of the at least one first flute and the at least one helical flute cutting edges generally lie in a common radial plane, wherein the body includes at least one cylindrical margin formed thereabout for providing bearing support to the reamer within the hole being formed;
   wherein the at least one first flute cutting edge and the at least one helical flute cutting edge concurrently and collectively perform the first and helical cutting operations to a sculpture surface of the workpiece, thereby improving tolerances of the cutting operations to a range of 0.001 inches, varying the loads imparted to the workpiece and the reamer, and reducing heat generated between the workpiece and the reamer.

2. The reamer of claim 1 wherein the at least one first flute is further defined as at least one straight flute.

3. The reamer of claim 1 wherein the at least one first flute cutting edge is further defined as at least one straight flute cutting edge.

4. The reamer of claim 1 wherein a longitudinal dimension between the at least one first flute cutting edge and the at least one helical flute cutting edge is less than ten percent of an overall transverse dimension of the reamer body.

5. The reamer of claim 1 wherein the body is generally cylindrical.

6. The reamer of claim 1 wherein the longitudinal body has an imaginary plane extending axially through the axis of rotation, and the at least one first flute is formed ahead of the imaginary plane in the first hand rotational direction thereby providing a negative rake angle to the at least one first flute cutting edge.

7. The reamer of claim 1 wherein the longitudinal body has an imaginary plane extending axially through the axis of rotation, and the at least one helical flute is formed ahead of the imaginary plane in the first hand rotational direction thereby providing a negative rake angle to the at least one helical flute cutting edge.

8. The reamer of claim 1 wherein the cylindrical margin extends longitudinally along the body generally aligned with the at least one first flute for providing bearing support to the reamer within the hole being formed.

9. The reamer of claim 8 wherein the cylindrical margin has a width within a range of 0.008 to 0.012 inches.

10. The reamer of claim 1 wherein the cylindrical margin extends helically along the body generally aligned with the at least one helical flute for providing bearing support to the reamer within the hole being formed.

11. The reamer of claim 10 wherein the cylindrical margin has a width within a range of 0.015 to 0.020 inches.

12. The reamer of claim 1 wherein the body further includes at least one gash formed in the body distal end extending outwardly in relation to an axis of rotation and intersecting the at least one first flute and the at least one helical flute for assisting removal of debris from the at least one helical flute cutting edge.

13. The reamer of claim 1 wherein the shank includes an ingress port for receiving a cutting fluid and for transmitting the cutting fluid through a fluid passage, and the body includes at least one egress port connected to the fluid passage and formed within either of the at least one first flute and the at least one helical flute for conveying the cutting fluid to the associated cutting edge and the sculpture surface defined within the workpiece.

14. The reamer of claim 1 wherein the body further includes at least one relief surface formed at least partially along the at least one helical flute cutting edge, the at least one relief surface having a first relief angle which is inclined in relation to a radial plane and a direction of cutting edge travel, the body including at least one other relief surface formed at least partially along the at least one first flute cutting edge, the at least one other relief surface having a second relief angle that is less than the first relief angle.

15. The reamer of claim 1 wherein the at least one first flute culling edge comprises a leading edge inclined in relation to a radial plane.

16. The reamer of claim 1 further comprising a pilot extending axially forward from the body distal end, the pilot being sized to be received within the pre-existing hole to provide bearing support to reamer within the hole being formed.

17. The reamer of claim 1 wherein the at least one first flute cutting edge comprises an end cutting edge formed at an intersection of the at least one first flute and the distal end of the body, and a leading edge inclined in relation to a radial plane.

18. The reamer of claim 1 wherein the tolerances of the cutting operation are plus or minus 0.0005 inches.

19. The reamer of claim 1 wherein the tolerances of the cutting operation are plus or minus 0.0003 inches.

20. The reamer of claim 1 wherein the cylindrical margin has a diameter generally equivalent to that of the hole being formed.

21. The reamer of claim 1 wherein the body further includes at least one primary relief surface formed along the at least one first flute cutting edge having a primary relief angle.

22. The reamer of claim 21 wherein the body further includes at least one secondary relief surface formed along the at least one primary relief surface spaced apart from the at least one first flute cutting edge having a secondary relief angle that is greater than the primary relief angle.

23. The reamer of claim 1 wherein the at least one first flute further comprises an array of first flutes.

24. The reamer of claim 23 wherein the array of first flutes has an angular spacing tolerance between sequential first flutes that is equal to or less than four radial quadrants divided by twice the number of first flutes in the array in order to vary the loads imparted to the workpiece and the reamer.

25. The reamer of claim 1 wherein the at least one helical flute further comprises an array of helical flutes.

26. The reamer of claim 25 wherein the array of helical flutes has an angular spacing tolerance between sequential helical flutes that is equal to or less than four radial quadrants divided by twice the number of helical flutes in the array in order to vary the loads imparted to the workpiece and the reamer.

27. The reamer of claim 1 wherein the at least one first flute further comprises an array of first flutes and the at least one helical flute further comprises an array of helical flutes.

28. The reamer of claim 27 wherein the number of first flutes in the first flute array is equal to the number of helical flutes in the helical flute array.

29. The reamer of claim 27 wherein the number of first flutes is equal to three.

30. The reamer of claim 27 wherein the number of first flutes is equal to five.

31. The reamer of claim 27 wherein each first flute cutting edge is radially spaced apart from each helical flute cutting edge at the reamer body distal end.

32. A reamer for enlarging a pre-existing hole in a workpiece by rotational and axial cutting, the reamer comprising:
   a longitudinal shank for supporting a body of a reamer for enlarging a pre-existing hole in a workpiece by rotation and axial movement relative to the workpiece in a first hand rotational direction; and
   a longitudinal body extending axially from the shank, the body having at least one first flute formed therein, providing at least one first flute cutting edge in a distal end of the body for imparting a first cutting operation to the workpiece, the body having at least one helical flute formed therein in a second hand rotational direction opposite to the first hand rotational direction so that cutting debris is advanced ahead of the at least one helical flute, the at least one helical flute being non-intersecting with the at least one first flute at the body distal end, the at least one helical flute providing at least one helical flute cutting edge in the body distal end, radially spaced apart from the at least one first flute, for imparting a helical cutting operation to the workpiece, wherein the body includes at least one cylindrical margin formed thereabout for providing bearing support to the reamer within the hole being formed;
   wherein the at least one first flute cutting edge and the at least one helical flute cutting edge concurrently and collectively perform the first and helical cutting operations to a sculpture surface of the workpiece, thereby improving tolerances of the cutting operations to a range of 0.001 inches, varying the loads imparted to the workpiece and the reamer and reducing heat generated between the workpiece and the reamer.

33. The reamer of claim 32 wherein the cylindrical margin extends longitudinally along the body generally aligned with the at least one first flute for providing bearing support to the reamer within the hole being formed.

34. The reamer of claim 32 wherein the cylindrical margin extends helically along the body generally aligned with the at least one helical flute for providing bearing support to the reamer within the hole being formed.

35. The reamer of claim 32 wherein the cylindrical margin has a diameter generally equivalent to that of the hole being formed.

36. A method for reaming a pre-existing hole, the method comprising the steps of:
   providing a reamer having a body with at least one first flute with at least one first flute cutting edge in a distal end of the body, the body having at least one helical flute formed therein canted relative to the at least one first flute, with at least one helical flute cutting edge in the distal end of the reamer, wherein the body includes at least one cylindrical margin formed thereabout for providing bearing support to the reamer within the hole being formed;
   rotating one of the reamer or a workpiece; and
   translating one of the reamer or the workpiece towards another so that the reamer is fed into the preexisting hole, and the at least one first flute cutting edge and the at least one helical flute cutting edge concurrently and collectively provide cutting operations to a sculpture surface formed within the pre-existing hole with a tolerance range of 0.001 inches.

* * * * *

UNITED STATES PATENT AND TRADEMARK OFFICE
CERTIFICATE OF CORRECTION

PATENT NO. : 7,207,752 B2 Page 1 of 1
APPLICATION NO. : 10/770888
DATED : April 24, 2007
INVENTOR(S) : Paul Martin Schulte It is certified that error appears in the above-identified patent and that said Letters Patent is hereby corrected as shown below:

Column 11, Line 8, Claim 15:

Delete "culling" and insert -- cutting --.

Signed and Sealed this

Twenty-fourth Day of July, 2007

JON W. DUDAS
*Director of the United States Patent and Trademark Office*